Patented May 22, 1951

2,554,142

UNITED STATES PATENT OFFICE 2,554,142

STABILIZER FOR HALOGEN-CONTAINING POLYMERS

Oliver J. Grummitt, Cleveland, Ohio, assignor to The Sherwin-Williams Company, Cleveland, Ohio, a corporation of Ohio No Drawing. Application February 25, 1950, Serial No. 146,409

16 Claims. (Cl. 260—45.85)

This invention relates as indicated to stabilizers for polymeric compositions containing halogen atoms, and more particularly to certain salts of organic acids which are useful in inhibiting deterioration of such halogen containing polymers. Polymeric compositions containing halogen atoms such as fluorine, chlorine and bromine, deteriorate upon exposure to heat and/or light. Such exposures, especially to heat, frequently occur during fabrication of the material, and light exposure may occur throughout the life of the material. This change results in discoloration, embrittlement, and loss of strength in cast or extruded films, coatings, etc. To overcome these undesirable characteristics, is has become convenient to incorporate with the polymeric material various compounds which have the property of inhibiting the tendency of the halogen-containing polymers to break down upon exposure to heat and/or light. While many salts, especially those based on alkali and alkaline earth metals are known to be stabilizers, it has now been discovered that certain salts of unsaturated organic acids give materials of an exceptionally high degree of stabilizing activity.

It is, therefore, a principal object of this invention to provide a method of stabilizing halogen-containing polymers to improve the resistance of such polymers to conditions of heat and light.

A further object of this invention is the provision of a stable halogen-containing polymeric material which will resist deterioration upon exposure to heat and/or light. A further object of this invention is to provide agents which do not alter the transparency of clear polymers of the color of pigmented polymers.

Still another object of this invention is to provide agents, and compositions containing the same, which agents are compatible to the halogen-containing polymers in the presence of plasticizers such as hydrocarbons, polyesters, alkyd resins, phthalates, phosphates, and the like. Other objects of the invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

Broadly stated, my invention is in the provision of a stabilized halogen-containing polymeric resin containing as a stabilizer therefor from about .1 to 10 parts per 100 parts of polymer, and alkali or alkaline earth metal salt of an alpha-beta, gamma-delta unsaturated monobasic organic acid. These acids contain at least 5 carbon atoms, and preferably 6 carbon atoms. More particularly, my invention is in the provision of a composition having as a major constituent thereof a polyvinyl halide, which composition has been stabilized with from .1 to 10 parts per 100 parts of polymer of an alkali or alkaline earth metal salt of sorbic acid.

As indicated above, I have discovered that certain unsaturated acids give salts of exceptionally high degree of stabilizing activity. The unsaturated acids of this invention are those containing two or more double or triple bonds in conjugated positions with respect to each other, and with one multiple linkage between the alpha and beta carbon atoms, i. e., between the carbon atom adjacent to and the carbon atom once removed from the carboxyl group. A typical member of this class is sorbic acid,

Another example is alpha-furylacrylic acid,

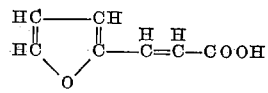

The simplest member of the diolefinic type would be Δ2,3,4,5-pentadienoic acid, and the simplest member of the diacetylenic type would be Δ 2, 3, 4, 5 - pentadiynoic. Mixed olefinacetylene types are also contemplated herein.

The alkali metal salts of such acids including lithium, sodium, and potassium and the alkaline earth metal salts including calcium, barium, strontium and magnesium in concentrations of .1 to 10% with respect to the halogen-containing polymer are highly effective in retarding and inhibiting the deterioration caused by light and/or heat. The term "basic reacting metal" as used herein and in the appended claims is intended to be inclusive of the alkali and alkaline earth metals.

While I have indicated that halogen-containing polymers in general are beneficiated by the stabilizers of this invention, I have found that these stabilizers are particularly useful when used in combination with the vinyl halide polymers such as the vinyl chlorides, the vinyl fluorides and the vinyl bromide polymers. I intend to include also copolymers of the aforementioned vinyl halides with vinyl alcohol or with a vinyl ester of a low molecular weight aliphatic acid such as vinyl acetate. A class of vinyl copolymers with which the stabilizers of this invention may be used to advantage are the vinyl chloride-vinyl acetate copolymers containing from about 60% to 95% by weight of vinyl chloride. This class of resins is disclosed in the patent to Reid 1,935,577. Other useful vinyl resins are disclosed in the patent to Semon 1,929,453. I may also use mixed resins, e. g. a mixture of polyvinyl chloride and a copolymer of polyvinyl chloride with polyvinyl acetate or polyacrylonitrile. Satisfactory results are also obtained with the vinylidene halides. Thus, where I refer to a vinyl halide resin herein and in the appended claims, I intend any of the foregoing resins. Generally, these vinyl halide resins will contain a major amount of vinyl halides such as vinyl chloride, and by the term "major amount" I mean in excess of 50% vinyl halide up to and including 100% of a particular vinyl halide or a 100% mixture of vinyl halides.

It becomes convenient at this point to illustrate my invention by specific examples which are for illustrative purposes only and not to be construed as limitations upon the scope of this invention.

EXAMPLE I 20.8 grams (0.505 mol) of 97% sodium hydroxide pellets were dissolved in 20 grams of water. 56 grams (0.5 mol) of sorbic acid was dissolved in 300 ml. of hot 99% isopropyl alcohol. The sodium hydroxide solution was added portion-wise with stirring to the sorbic acid solution. After stirring .5 hr. following the addition, the mixture was cooled, filtered, and the precipitate washed with two 25 ml. portions of isopropyl alcohol. After drying in air the yield of sodium sorbate was found to be 64 grams, or 94% of the theoretical yield.

EXAMPLE II 250 ml. of sodium methylate solution, made by dissolving 12.5 grams of sodium in 250 ml. of absolute methanol, were added to a hot solution of 56 grams of sorbic acid dissolved in 600 ml. of absolute methanol with stirring. Stirring ½ hour after the addition, cooling to room temperature, filtering, and washing the precipitate with two 30 ml. portions of absolute methanol gave 34 grams (51% yield) of crystalline sodium sorbate.

Other variations in the preparation of sodium sorbate which have been tried and found to work satisfactorily are the use of water, ethyl or methyl alcohols as a solvent for the sorbic acid and for the sodium hydroxide; and the use of sodium carbonate dissolved in water in place of sodium hydroxide or sodium methylate. Water soluble alcohols as solvents for the sorbic acid have the advantage of reducing the solubility of sodium sorbate in the reaction mixture and therefore allowing a high yield on cooling and filtering.

EXAMPLE III

Lithium sorbate was made by adding with stirring a solution of 35.7 grams (0.71 mol) of 48% pure lithium hydroxide dissolved in 300 ml. of water to a solution of 80 grams (0.71 mol) of sorbic acid dissolved in 300 ml. of 99% isopropyl alcohol. After cooling to 10° and filtering, 45 grams of lithium sorbate was collected as the residue. Evaporation of the filtrate to dryness gave 34 grams of additional lithium sorbate increasing the total yield to 79 grams or 93% of the calculated yield.

EXAMPLE IV

Potassium sorbate was made by adding portion-wise a solution of 210 grams (3.2 mols) of 85% potassium hydroxide in 210 grams of water to a hot (60–70° C.) solution of 356 grams (3.17 mols) of sorbic acid dissolved in 1.25 liters of 99% isopropyl alcohol. After stirring ½ hour after the addition, the mixture was cooled to 0–5° C. and filtered to give 125 grams of potassium sorbate. The filtrate was concentrated under reduced pressure to about 250 ml., cooled and filtered to give 306 grams. The total yield was 431 grams, or 90% of the calculated yield.

EXAMPLE V

In preparing mixtures of a halogen-containing polymer, plasticizer, a sorbate stabilizer, etc. the sorbate may be in the form of a dry solid, or, more conveniently, in some cases, as a solution. Potassium sorbate, for example, is quite soluble in water-alcohol mixtures. The following solutions are illustrative.

| | Parts by weight |
|---|---|
| Potassium sorbate | 25.5 |
| Isopropyl alcohol (99%) | 53.5 |
| Water | 19.3 |
| Potassium sorbate | 26.5 |
| Ethyl alcohol (95%) | 57.2 |
| Water | 14.5 |
| Potassium sorbate | 33.2 |
| Methyl alcohol (abs.) | 46.0 |
| Water | 20.8 |

The sorbates are not soluble in most organic solvents such as hydrocarbons, ketones, and esters. However, if a plasticizer such as dioctyl phthalate is used in the resin composition, the mixing of the sorbate stabilizer is facilitated by grinding the plasticizer and sorbate together so as to obtain a fine dispersion.

The alkaline earth sorbates, such as may be prepared by double decomposition from the alkali metal salts, may be conveniently introduced into the polymeric composition in the same manner as indicated immediately above.

EXAMPLE VI

Calcium sorbate was made by the double decomposition reaction of sodium sorbate with calcium nitrate. A solution of sodium sorbate was made by reacting 73 grams (0.69 mol) of anhydrous sodium carbonate dissolved in 500 ml. of water with 154 grams (1.36 mols) of sorbic acid by adding the acid portion-wise while stirring and heating the mixture to a temperature of 70–80° C. To this mixture was added 250 ml. of water and a solution of 162 grams (0.68 mol) of calcium nitrate tetrahydrate dissolved in 800 ml. of water. The precipitated calcium sorbate was filtered and washed with two 100 ml. portions of water. After drying at 100° C. the yield of salt was 174 grams, or 92.5% of the calculated yield.

EXAMPLE VII 100 parts by weight of a polymer of vinyl chloride were thoroughly mixed with 50 parts by weight of dioctyl phthalate and 0.8 part by weight of sodium sorbate. The mixture of polymer, plasticizer, and stabilizer was milled for 2 minutes at an elevated temperature which in this case was 149° C. on a 2 roll mill. The milled sheet was molded for 30 seconds under 2,000 lbs. per square inch pressure in a hydraulic press heated to 149° C., to give a colorless, transparent sheet approximately 0.090 inch thick.

EXAMPLE VIII

A milled sheet was prepared according to Example VII using 0.8 part by weight of potassium sorbate as the stabilizer.

EXAMPLE IX

A milled sheet was prepared according to Example VII using a quantity of 26.5% sorbate solution (see Example V) so that 0.8 part by weight of potassium sorbate was incorporated as the stabilizer.

Samples from the sheets made as described in Examples VII, VIII and IX were tested and compared with a similar sheet containing 3.0 parts by weight of strontium naphthenate, a standard stabilizer for vinyl resins, instead of the sorbate, in an air circulating oven at 150° C. and in an Eveready Ultra Violet Light Tester.

*Table*

| Stabilizer | Strontium Naphthenate | Sodium Sorbate | Potassium Sorbate | Potassium Sorbate Solution |
|---|---|---|---|---|
| 1. Amount Used (Parts per 100 parts of polymer) | 3.0 | 0.8 | 0.8 | 0.8 |
| 2. Color of Original Sheet | Very Slight | None | None | None |
| 3. Transparency of Original Sheet | Clear | Clear | Clear | Clear |
| 4. Blooming or Exuding of Stabilizer to Surface of Sheet | None | None | None | None |
| 5. Water Absorption (Per Cent Gain in weight after immersion for 7 days at 85° C.) | 3.4 | 11.3 | 10.6 | 11.0 |
| 6. Heat Loss (Per Cent Loss in Weight after 96 hrs. in an oven at 100° C.) | 3.6 | 3.0 | ---------- | ---------- |
| 7. Heat Stability (after 1 hr. in oven at 150° C.) [1] | 3 | 5 | 4 | 4 |
| 8. Heat stability (after 3 hrs. in oven at 150° C.) | 3 | 4 | 3 | 3 |
| 9. Light Stability (after 21 days in Eveready Twin Carbon arc Ultra violet Light Tester) [1] | 3 | 5 | 5 | 5 |

[1] Stability decreases in the order 5, 4, 3, 2, 1.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A composition comprising a halogen-containing polymeric resin containing as a stabilizer therefor from about .1 to about 10 parts per 100 parts of polymer of a basic-reacting metal salt of an alpha-beta, gamma-delta unsaturated olefinic monobasic organic acid.

2. A composition in accordance with claim 1 in which the halogen-containing polymeric resin is polyvinyl halide.

3. A composition in accordance with claim 1 in which the halogen-containing resin is polyvinyl chloride.

4. A composition in accordance with claim 1 in which the polymeric resin contains a major amount of polyvinyl halide.

5. A composition in accordance with claim 1 in which the polymeric resin is a copolymer of a vinyl halide and a vinyl ester of a low molecular weight aliphatic acid.

6. A composition in accordance with claim 1 in which the polymeric resin is a copolymer of vinyl chloride and vinyl acetate containing from about 60% to 95% by weight of vinyl chloride.

7. A composition in accordance with claim 1 in which the stabilizer is an alkali metal salt of an alpha-beta, gamma-delta unsaturated olefinic monobasic organic acid.

8. A composition in accordance with claim 1 in which the stabilizer is an alkaline earth metal salt of alpha-beta, gamma-delta unsaturated olefinic monobasic organic acid.

9. A composition in accordance with claim 1 in which the alpha-beta, gamma-delta unsaturated olefinic monobasic organic acid is sorbic acid.

10. A composition in accordance with claim 1 in which the stabilizer is sodium sorbate.

11. A composition in accordance with claim 1 in which the halogen-containing polymeric resin is a polyvinyl halide polymer and the stabilizer therefor is sodium sorbate.

12. A composition having as a major constituent thereof a polyvinyl halide, which composition has been stabilized with from .1 to 10 parts per 100 parts of polymer of a basic-reacting metal salt of sorbic acid.

13. A composition having as a major constituent thereof a copolymer of vinyl chloride and vinyl acetate, which composition has been stabilized with from .1 to 10 parts per 100 parts of polymer of sodium sorbate.

14. A composition having as a major constituent thereof a copolymer of vinyl chloride and vinyl acetate, which composition has been stabilized with from .8 to 10 parts per 100 parts of polymer of sodium sorbate.

15. A composition in accordance with claim 1 in which the stabilizer is a sodium salt of an alpha-beta, gamma-delta unsaturated olefinic monobasic organic acid selected from the group consisting of sorbic acid and alpha-furylacrylic acid.

16. The method of stabilizing a halogen-containing polymeric material which comprises adding to 100 parts by weight of said material, 50 parts by weight of dioctyl phthalate, and from .1 to 10 parts by weight of a basic-reacting metal salt of an alpha-beta, gamma-delta unsaturated olefinic monobasic organic acid, and milling said mixture at an elevated temperature.

OLIVER J. GRUMMITT.

REFERENCES CITED

The following references are of record in the file of this patent:

UNITED STATES PATENTS

| Number | Name | Date |
|---|---|---|
| 2,364,410 | Whittaker | Dec. 5, 1944 |

OTHER REFERENCES

Plasticizers—Carbide and Carbon Chemicals Corp., 1944, New York, page 6.